United States Patent [19]
Wormley

[11] 4,026,342
[45] May 31, 1977

[54] SPRING WHEEL HAVING AN OVERLOAD STOP

[76] Inventor: James D. Wormley, 11010 Palmeras Drive, Sun City, Ariz. 85351

[22] Filed: Nov. 17, 1975

[21] Appl. No.: 632,535

[52] U.S. Cl. .................................. 152/18; 152/19; 152/73

[51] Int. Cl.² .......................................... B60B 9/04

[58] Field of Search ............ 301/5 R, 8; 152/18–19, 152/73, 76, 79

[56] References Cited

UNITED STATES PATENTS

| 847,099 | 3/1907 | Nelson | 152/73 |
|---|---|---|---|
| 1,001,753 | 8/1911 | Goldsmith | 152/19 |
| 1,040,426 | 10/1912 | Sanders | 152/19 X |
| 1,049,129 | 12/1912 | Moore | 152/73 X |
| 1,130,762 | 3/1915 | Pirtle | 152/19 X |

FOREIGN PATENTS OR APPLICATIONS

| 803,743 | 4/1951 | Germany | 152/73 |
|---|---|---|---|
| 16,010 | 8/1895 | United Kingdom | 301/8 |
| 10,195 | 5/1906 | United Kingdom | 152/73 |

Primary Examiner—Robert B. Reeves
Assistant Examiner—Charles A. Marmor
Attorney, Agent, or Firm—Edward Hoopes, III

[57] ABSTRACT

A wheel comprising a hub element, a rim element, a plurality of substantially circular bands of flexible material spaced about the hub element interposed between and bearing against both of the elements, the axes of the bands being parallel to the axes of the elements, and fastening devices fastening the bands of flexible material to the elements, each fastening device being mounted at its end portions on one of the elements and at its mid-portion engaging one of the bands on the inner peripheral surface thereof only to clamp the band against the element, the bands of flexible material being spaced apart so as at all times to act freely individually and flexing to provide a cushioning effect when the wheel rolls over rough terrain.

2 Claims, 3 Drawing Figures

SPRING WHEEL HAVING AN OVERLOAD STOP

This invention relates to a wheel of the type having bands of flexible material interposed between the hub and rim to provide a cushioning or springing effect when the wheel rolls over rough terrain. The invention has to do particularly with the provision of improved means for fastening the bands to the hub and rim whereby important new and useful results are achieved, and also with the provision of means operable when a cushioning or springing effect is not desired to rigidly connect the hub and rim to provide in effect a conventional wheel.

Heretofore in wheels having bands of flexible material interposed between the hub and rim the bands have been maintained in place by rivets, bolts or screws penetrating the bands. When a band is punctured to provide a hole for a fastener such as a rivet, screw or bolt an area of stress concentration during springing cycles is created around the edge of the hole and around the head of the fastener or fastener-keeper reducing the strength, durability and springiness of the band and also the ability of the band to withstand side thrust forces. Also band replacement is rendered difficult and in some cases impossible.

I have obviated the disadvantages above stated by the provision of novel means for fastening the bands to the hub and rim elements. I provide fastening devices each mounted on one of the hub and rim elements and engaging one of the bands on the inner peripheral surface thereof only to clamp the band against the element. Preferably each fastening device passes within the band and is carried by the hub element or rim element at opposite sides of the band. Each fastening device may engage the band across the full width of the inner peripheral surface thereof. Each fastening device may have a lateral protuberance within the band which engages the band on the inner peripheral surface thereof only, desirably in substantial line contact parallel to the axis of the band.

I also desirably provide the wheel with means operable when the cushioning effect is not desired to rigidly connect the hub element and rim element to provide in effect a conventional wheel. Such means may include spoke-like members positionable to maintain the hub element and rim element in relatively fixed position. Desirably a device is provided which is fastenable to the hub element in a plurality of positions in one of which the hub element and rim element are rigidly connected and in another of which the hub element and rim element are not rigidly connected. The device may have means predeterminedly limiting the extent of flexing of the bands when the device is fastened to the hub element in the position in which the hub element and rim element are not rigidly connected.

Other details, objects and advantages of the invention will become apparent as the following description of a present preferred embodiment thereof proceeds.

In the accompanying drawings I have shown a present preferred embodiment of the invention in which FIG. 1 is a face view of a wheel embodying the invention;

Figure 2:
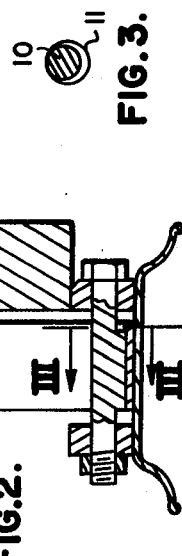
FIG. 2 is an axial cross-sectional view taken on the line II—II of FIG. 1.

Referring now more particularly to the drawings, there is shown an axle designated generally by reference numeral 2 on which is rotatably mounted a wheel constructed in accordance with my invention. The wheel comprises a hub 3 and a rim 4. In the form shown the hub 3 has four pairs of axially opposed outwardly extending radial projections 5 and the rim 4 has four pairs of axially opposed inwardly extending radial projections 6. Each pair of projections 5 on the hub is in radial alignment with one of the pairs of radial projections 6 on the rim. Disposed within each of such sets of radial projections 5 and 6, as clearly shown in FIG. 2, is a circular band 7 of flexible or yieldable material which may be spring steel, plastic or other material having the requisite flexing or yielding property. Each band 7 abuts against the hub 3 at 8 and abuts against the rim 4 at 9 (FIG. 2). A fastening device in the form of a pin 10 is mounted in each of the pairs of projections 5 and 6 and passes within the band 7 which is disposed between those projections as clearly shown in FIG. 2. Each pin 10 has a lateral protuberance 11 within the band which is adapted to engage the band on the inner peripheral surface thereof across the full width of the band to clamp the band against the hub or rim. Each pin 10 has a head 12 at one end and is threaded at 13 at the opposite end to receive a nut 14 whereby the pin may be tightened in place. Before the nut is tightened the pin is turned so that the protuberance 11 extends radially outwardly of the band to tightly clamp the band to the hub or rim in substantially line contact parallel to the axis of the band.

The structure thus far described constitutes a yieldable wheel in which the bands flex to provide a cushioning effect when the wheel rolls over rough terrain. The bands are maintained in place without puncturing them to provide a hole for a fastener such as a rivet, screw or bolt which would create an area of stress concentration during yielding or springing cycles as above referred to. Also my wheel construction facilitates replacement of a band if a band after prolonged use loses its elasticity or becomes damaged or if a band of different width or other characteristics is to be installed.

Figure 1:
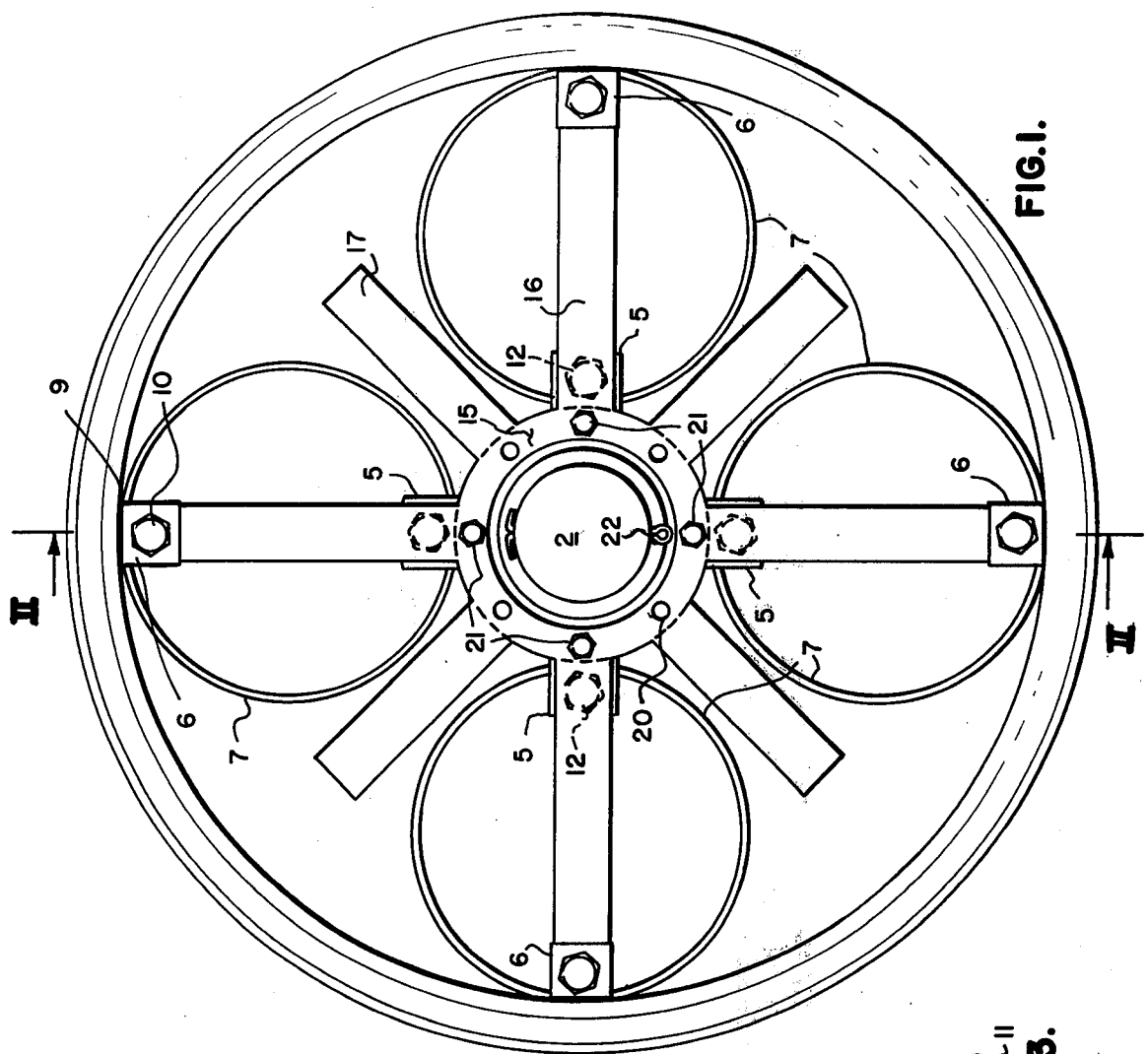
Figure 3:
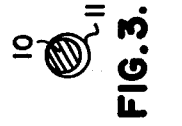
FIG. 3 is a detail cross-sectional view taken on the line III—III of FIG. 2.

As above stated, I provide means operable when the cushioning effect is not desired to rigidly connect the hub and rim of the wheel to provide in effect a conventional wheel. In the form shown such means comprises a spider 15 having a plurality of radially extending arms of different lengths. In the form shown the spider 15 has four relatively long arms 16 and four relatively short arms 17. As shown in FIG. 1 the arms 16 are spaced apart 90° and the arms 17 are spaced apart 90°, each arm of one length being exactly half way between adjacent arms of the other length.

The hub 3 is provided with four internally threaded bores 18 spaced apart 90° about the axis of the hub. The spider 15 has two sets of bores, these comprising bores 19 spaced apart 90° and bores 20 also spaced apart 90°. The bores 20 are exactly half way between adjacent bores 19. The bores 19 and 20 of the spider 15 are at the same distance radially outwardly from the axis of the wheel as are the bores 18 of the hub.

In the drawings the spider 15 is shown as being connected with the hub 3 by screws 21 which extend through the bores 19 of the spider and thread into the bores 18 of the hub. With the spider thus connected to the hub the longer arms 16 of the spider have their outer ends abutting the inner ends of projections 6 of the rim so that the arms 16 prevent flexing or yielding of the bands 7 and in effect convert the wheel into a conventional rigid wheel.

When the wheel is to be converted from a conventional rigid wheel into a flexible or yieldable wheel the bolts 21 are removed and the spider is rotated 45° and is fastened to the hub by introducing the bolts 21 through the bores 20 of the spider and into the threaded bores 18 of the hub. This places the shorter arms 17 in alignment with projections 6 of the rim. When the wheel is not under load there is a space between the outer end of each arm 17 and one of the projections 6 of the rim so that the bands 7 are permitted to yield to a predetermined extent. The bands 7 yield until the outer ends of the arms 17 engage projections 6 of the rim whereafter further yielding of the bands is prevented. The length of the arms 17 may be determined so as to limit flexing or yielding of the bands to an extent within their elastic limit.

In the form shown when the shorter arms 17 of the spider are in radial alignment with projections 6 of the rim the longer arms 16 of the spider will engage the rim intermediate projections 6 at the same time as the outer ends of the arms 17 will engage projections 6 so actually my result can be obtained without utilizing the shorter arms 17 at all, relying on engagement of the longer arms 16 with the rim intermediate projections 6 of the rim to limit flexing of the bands within the elastic limit thereof. However, I prefer to employ a spider with both long and short arms as shown in FIG. 1 since both sets of arms will engage the rim at the same time creating a stronger and more stable wheel.

The wheel is maintained in place on the axle by a keeper 22 with washers 23 disposed about the axle at opposite faces of the hub 3 as shown in FIG. 2.

While I have shown and described a present preferred embodiment of the invention it is to be distinctly understood that the invention is not limited thereto but may be otherwise variously embodied within the scope of the following claims.

I claim:

1. A wheel comprising a hub element, a rim element, a plurality of substantially circular bands of flexible material spaced about the hub element interposed between and bearing against both of said elements, the axes of the bands being parallel to the axes of said elements, fastening means fastening the bands of flexible material to said elements, the bands of flexible material being spaced apart so as to at all times act freely individually and normally flexing to provide a cushioning effect when the wheel rolls over rough terrain, and means within the confines of the wheel operable when such cushioning effect is not desired to rigidly connected the hub element and rim element to provide in effect a conventional wheel, said last mentioned means including substantially radial spoke-like members of different lengths selectively fastenable to the hub element in a first position in which the outer ends of the longer spoke-like members engage the rim element to rigidly connect the hub element and rim element and a second position in which the hub element and rim element are not rigidly connected and the outer ends of the shorter spoke-like members engage the rim element after predetermined flexing of the bands to limit the extent of such flexing.

2. A wheel as claimed in claim 1 in which the rim element has inwardly extending radial projections and said last mentioned means include substantially radial spoke-like members of different lengths selectively fastenable to the hub element in a first position in which the outer ends of the longer spoke-like members engage said inwardly extending radial projections to rigidly connect the hub element and rim element and a second position in which the hub element and rim element are not rigidly connected and the outer ends of the shorter spoke-like members engage said inwardly extending radial projections after predetermined flexing of the bands to limit the extent of such flexing.

* * * * *